US012631225B2

(12) United States Patent
Gädke et al.

(10) Patent No.: US 12,631,225 B2
(45) Date of Patent: May 19, 2026

(54) DRUM BRAKE HAVING COMPENSATION OF BRAKE-SHOE TRANSVERSE OFFSET

(71) Applicant: Continental Automotive Technologies GmbH, Hannover (DE)

(72) Inventors: Martin Gädke, Hofheim (DE); Adrian Messner, Mainz (DE); Uwe Bach, Niedernhausen (DE); Ahmed Sefo, Frankfurt am Main (DE); Matthias Schulitz, Frankfurt am Main (DE); Jens Hoffmann, Darmstadt (DE); Christian Vey, Petersberg (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 463 days.

(21) Appl. No.: 18/041,446

(22) PCT Filed: Aug. 5, 2021

(86) PCT No.: PCT/DE2021/200103
§ 371 (c)(1),
(2) Date: Feb. 13, 2023

(87) PCT Pub. No.: WO2022/033642
PCT Pub. Date: Feb. 17, 2022

(65) Prior Publication Data
US 2023/0296147 A1    Sep. 21, 2023

(30) Foreign Application Priority Data
Aug. 11, 2020    (DE) ..................... 10 2020 210 134.5

(51) Int. Cl.
*F16D 51/20*        (2006.01)
*F16D 65/09*        (2006.01)

(52) U.S. Cl.
CPC ............. *F16D 51/20* (2013.01); *F16D 65/09* (2013.01)

(58) Field of Classification Search
CPC ................................ F16D 51/00; F16D 65/09
(Continued)

(56) References Cited

U.S. PATENT DOCUMENTS 2,221,090 A      11/1940   Goepfrich
3,752,273 A  *   8/1973   Haraikawa .............. F16D 65/18
                                                           60/579
(Continued)

FOREIGN PATENT DOCUMENTS

CN        206036070 U    3/2017
DE        2841372 A1    4/1979
(Continued)

OTHER PUBLICATIONS

Office Action dated Mar. 1, 2024 of the Counterpart Japanese application 2023-500354.
(Continued)

*Primary Examiner* — Christopher P Schwartz
(74) *Attorney, Agent, or Firm* — Buchanan Ingersoll & Rooney PC

(57) ABSTRACT

A drum brake for an electrical motor vehicle brake system wherein actuator means, a transmission means and a spreading device are in a force flow with movably mounted drum brake shoes that are suitable and designed to cooperate with a brake drum. The force flow, in a electromechanically actuatable drum brake such that closed-loop electrical brake control in conjunction with simple actuator control is made possible with reduced outlay over the entire wearing service life of the brake shoe. Transverse offset compensation is provided by way of, a joint-disk-type/joint-socket-type bearing geometry such that a friction lining bearing support
(Continued)

geometry with profiling allowing mutual articulation such that transversely oriented lining displacement with respect to the a direction is at least reduced.

13 Claims, 5 Drawing Sheets

(58) Field of Classification Search
USPC ................................ 188/78, 196 D, 328–343
See application file for complete search history.

(56) References Cited

U.S. PATENT DOCUMENTS

| | | | | | |
|---|---|---|---|---|---|
| 3,811,538 | A | * | 5/1974 | Farr | ......................... F16D 59/02 188/196 D |
| 3,951,243 | A | * | 4/1976 | Chouings | ................ B60T 7/206 188/328 |
| 5,398,790 | A | * | 3/1995 | McNinch, Jr. | .......... F16D 65/09 188/328 |
| 5,913,390 | A | * | 6/1999 | Hostetler | ................ F16D 51/22 188/78 |
| 9,512,891 | B2 | * | 12/2016 | Berwanger | ............. F16D 65/09 |
| 10,151,365 | B2 | * | 12/2018 | Bach | ..................... F16D 65/562 |
| 11,300,170 | B2 | * | 4/2022 | Bach | ........................ F16D 51/22 |
| 2017/0009832 | A1 | | 1/2017 | Gädke et al. | |

FOREIGN PATENT DOCUMENTS

| | | | |
|---|---|---|---|
| DE | 9419265 | U1 | 1/1995 |
| DE | 69326520 | T2 | 4/2000 |
| DE | 102016221189 | A1 | 5/2017 |
| DE | 102018215979 | A1 | 3/2020 |
| EP | 0 594 379 | A1 | 4/1994 |
| FR | 775896 | A | 1/1935 |
| JP | S5316169 | A | 2/1978 |
| JP | H118257 | A | 3/1999 |
| WO | 2015/082206 | A2 | 6/2015 |

OTHER PUBLICATIONS

German Search Report dated Jun. 15, 2021 for the counterpart German Patent Application No. 10 2020 210 134.5.
The International Search Report and the Written Opinion of the International Searching Authority mailed on Nov. 10, 2021 for the counterpart PCT Application No. PCT/DE2021/200103.
Alfred Teves Gmbh, ATE-Bremsenhandbuch—Berechnung, Funktion, Prüfung, Wartung, Instandsetzung, p. 129 and 130, 1986, Autohaus Berlag GmbH Ottobrunn bei München.
Notice of Refusal Aug. 28, 2024 for the counterpart Japanese Patent Application No. 2023-500354 and machine translation of same.
Notice of Rejection dated Oct. 21, 2024 for the counterpart Korean Patent Application No. 10-2023-7000980 and machine translation of same.
Japanese Office Action dated Mar. 24, 2025 corresponding to Japanese Patent Application No. 2023-500354.
Brazilian Search Report dated Apr. 16, 2024 for the counterpart Brazilian Patent Application No. BR112022025419-9 and machine translation of same.
Notice of Allowance (Decision to Grant a Patent) issued Jul. 16, 2025, by the Japan Patent Office in corresponding Japanese Patent Application No. 2023-500354 and an English translation of the Notice of Allowance. (3 pages).
Office Action (Notification pursuant to Article 94(3) EPC) issued May 21, 2025, by the European Patent Office in corresponding European Patent Application No. 21 762 605.0-1009 and an English machine translation of the Office Action. (12 pages).
Written Opinion issued Oct. 22, 2025, by the Brazil Patent Office in corresponding Brazilian Patent Application No. BR112022025419-9 and an English translation of the Written Opinion. (6 pages).
Office Action (The First Office Action) issued Jan. 20, 2026, by the State Intellectual Property Office of People's Republic of China in corresponding Chinese Patent Application No. 202180048065.1 and an English translation of the Office Action. (16 pages).

* cited by examiner

DRUM BRAKE HAVING COMPENSATION OF BRAKE-SHOE TRANSVERSE OFFSET

CROSS-REFERENCE TO RELATED APPLICATIONS

The present application is a National Stage Application under 35 U.S.C. § 371 of International Patent Application No. PCT/DE2021/200103 filed on Aug. 5, 2021, and claims priority from German Patent Application No. 10 2020 210 134.5 filed on Aug. 11, 2020, in the German Patent and Trademark Office, the disclosures of which are herein incorporated by reference in their entireties.

TECHNICAL FIELD

The invention relates to an electrohydraulically or electromechanically, actuatable drum brake for a motor vehicle brake system.

BACKGROUND

The prior art has disclosed hydraulically actuated drum brakes with actuator means, normally produced as hydraulic wheel cylinders, which make it possible for brake-actuating forces to be imparted, via actuating elements (hydraulic pistons), to cooperating brake shoes and consequently to a brake drum (see for example page 129 of "Bremsenhandbuch" ["Brake Handbook"] ISBN 3-89059-008-x; 9th edition, 1986). Conventional hydraulic drum brakes are unfortunately not readily suitable for ensuring all novel closed-loop control tasks with the required precision in a modern, electronically closed-loop-controlled drivetrain/brake system, without maintenance, over the service life of the vehicle.

DE 10 2018 215 979 A1 relates to a spreading device for spreading brake shoes of a drum brake for a motor vehicle, wherein a rotationally driven idle travel compensation device, including a readjustment screw that is rotatable in a spring-loaded manner, is integrated into the spreading device.

There is a further need for improvement because, in the relevant prior art, there are no further developed practicable solutions that allow appropriately complete handling of the effect of friction lining wear in modern motor-vehicle drum brake systems.

SUMMARY

A compensation device for brake shoe transverse offset is provided adjacent to the spreading device and/or to the abutment in a brake drum interior space wherein said transverse offset compensation device is incorporated laterally adjacent to the spreading device and/or abutment into the force flow of the drum brake. In the context of the present disclosure, on the basis of the transverse axis Q, the feature "transversely" means arranged orthogonally, at right angles, to the spreading axis S of the spreading device 2. Where this written disclosure refers for example in simplified form to an arrangement of the compensation means in the region of the spreading device, this then does not constitute a limitation; rather, the compensation means may equally be incorporated into the force flow laterally in the region of the abutment, wherein the combination as illustrated in the embodiment according to the drawing is provided.

The transverse offset compensation device may be incorporated in form-fitting fashion directly into the interface between spreading device and brake shoe. In the case of customer acceptance or demand, in an adaptive modification, an indirect incorporation of the compensation device can be easily retrofitted by form fit via at least one exchangeable adapter component, which is additionally incorporated into the force flow, without departing from the underlying concept.

In one refinement, the compensation device comprises, in its mutual contact region, an for example joint-like or movable bearing arrangement based on an articulated positive guide. For this purpose, a track guide of 2-dimensionally curved arcuate shape may be implemented in accordance with the model of a joint disk/joint socket. For purposes of the curved (track) guide arranged in the manner of a joint, it may be expedient if the contact geometry furthermore has at least one or more circular arc segments. Here, it may be the case that the paired radii of the circular arc segments that are mutually paired for contact are in each case differently curved for the purposes of nestled contact with one another. In the embodiment, when compared with one another, the radius positioned on an actuating element is dimensioned to be gradually smaller than the radius positioned on a brake shoe. Considered relative to one another, the radius on an actuating element may in this case be dimensioned to be approximately in the range of the brake drum diameter, whereas the counterpart with radius on a brake shoe may move approximately in the range from $\frac{1}{5}$-$\frac{1}{10}$ of the brake drum diameter. It is self-evident that the mutual nestled contact has the side effect of contributing to an improved ability for the contact pressure that prevails in the force flow to be transmitted through the paired components.

In a further embodiment, for increased effectiveness, it is furthermore possible for one or more centers of the relevant joint radii to be shifted to a certain extent, by a certain predefined offset, in the direction of the wheel axis of rotation, which makes a further contribution to reducing a wear-induced transverse offset.

In summary, systematic planned research into drum brake system relationships in conjunction with the new realization that, aside from idle travel compensation, further measures appear necessary and expedient in order to make a drum brake compatible for modern times. This is because the unavoidable entirely non-uniform drum brake shoe wear of a leading brake shoe and of a trailing brake shoe in conjunction with the wear pattern of a substantially uniformly concentrically wearing brake drum gives rise, over the service life of the system, to a degree of transverse offset for the force-transmitting bearing points—in their relationship with respect to the adjacent components, which are normally non-displaceable and/or arranged fixedly on a backplate (actuating element, spreading device, abutment). This in turn results in a change in lever arm caused by a degree of wear, which must be taken into consideration from a closed-loop control aspect, wherein, furthermore, the wear-induced offset with regard to the spreading device can cause an oppositely directed force couple to be generated to a certain degree, which can introduce transverse forces into the drivetrain of the wheel brake. The solution is based on the research findings discussed above, and therefore provides for the drum brake to be equipped with transverse offset compensation.

In an exemplary embodiment, the offset compensation implemented involves a joint-disk-like/joint-socket-like bearing geometry, produced with special geometric profiling, in the indirect or direct contact between actuating element and brake shoe, with the effect that the further developed compensation, by means of friction lining support bearing geometry, assists in preventing or at least reducing the wear-travel-induced displacement movement at the support bearing by means of a support bearing design with geometric profiling. The wear offset compensation is automatic, involves no electrical current and is automatically compensated, and in particular, the closed-loop control capability and also efficiency and force flow of an electromechanically actuatable drum brake are improved.

The use is accordingly suitable in principle for all motor vehicle brake systems that have at least one drum brake. Here, the wheel brake(s), in particular the drum brake(s), may be configured to be actuated electrically, in particular electrohydraulically and/or electromechanically, by means of an electronic control unit (ECU). In particular, it is made possible, through mechanical design, for the electrical brake-by-wire systems to reliably ensure electrical closed-loop brake control, in conjunction with electrical actuator activation, over the entire wearing brake shoe service life of a drum brake, with the consequence that complements recuperative dry brake systems, which operate flexibly in accordance with demand and in an interlinked manner. It is in no way imperative that the vehicle brake system has exclusively drum brakes; rather, a mixed installation in conjunction with one or more brake types, in particular in conjunction with disk brakes, is possible and basically intended. It is expedient here, but in no way imperative, for the different brake types in the vehicle brake system to be paired so as to be of the same type at each axle. Deviations from these principles, which may relate for example to brakes integrated into a drivetrain, are possible.

The arrangement is suitable in combination with brake systems that comprise drum brake load sensor means, wherein the drum brake load sensor means is fixed, adjacent to the compensation device and within a brake drum, to an anchor plate.

Further features and details of the invention, which may relate to advantageous exemplary embodiments of the invention configured in any desired combination in accordance with the overall content of the disclosure, will emerge from subclaims in conjunction with the description on the basis of the drawing, as follows.

BRIEF DESCRIPTION OF THE DRAWINGS

In the drawing, for the most part in sketch form diagrammatically by way of example.

DETAILED DESCRIPTION

Figure 1:
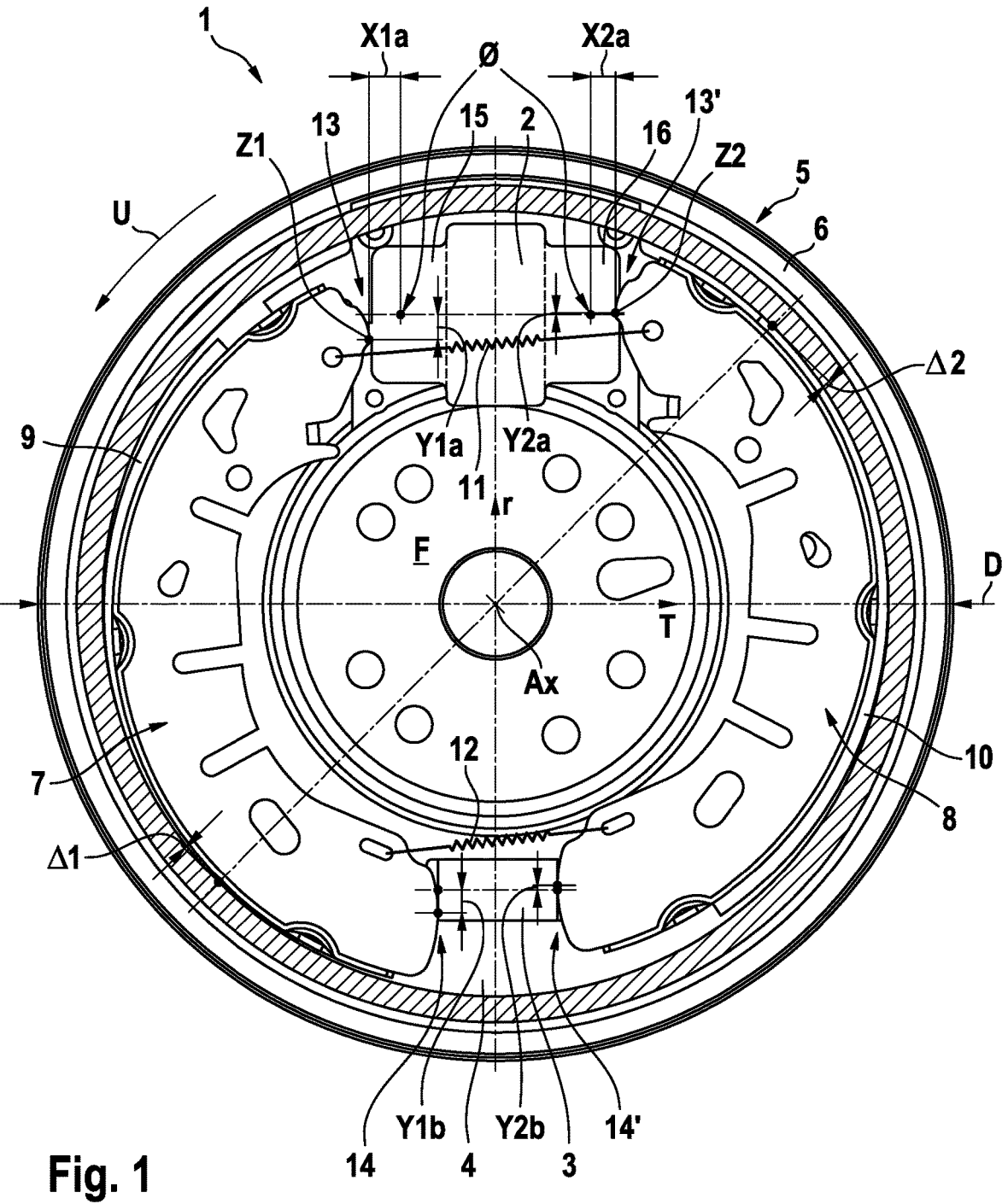
FIG. 1 illustrates wear-induced transverse offset/support bearing contact point "displacement" by way of example on a drum brake shoe (at approximately half scale) with a gradually rounded support bearing.

FIG. 1 illustrates wear-induced transverse offset/support bearing contact point "displacement" by way of example on a drum brake shoe (at approximately half scale) with a gradually rounded support bearing. The trailing brake shoe 7 is subject, at its support bearings/contact points (in relation to a preferential direction of rotation U), to a very great transverse offset Y1a/Y1b (by way of comparison, for example approximately 7.9/7.5 mm) over the friction lining service life under consideration.

Figure 2:
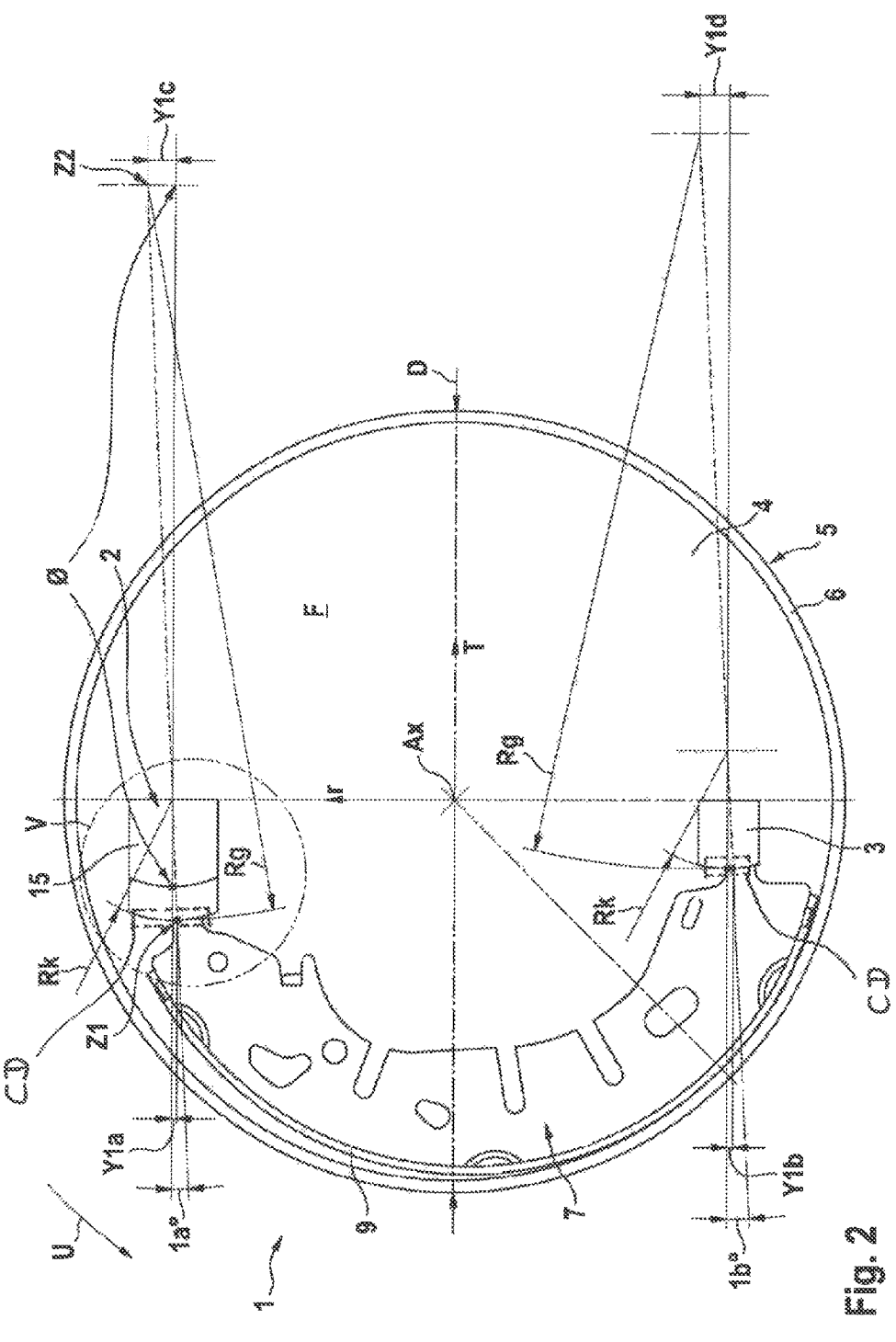
FIG. 2 depicts the transverse offset on a drum brake with compensation means/support bearing profiling ("shell-disk design")

FIG. 2 depicts how the transverse offset improves for example on a drum brake with compensation means/support bearing profiling ("shell-disk design"), illustrated at position CD. Over the friction lining service life, the transverse offset at the support bearing contact point accordingly decreases, at the trailing brake shoe 7, by approximately a factor of 4, that is to say the displacement movement is reduced to, for example, approximately 1.77/1.91 mm—in relation to an initial design as in FIG. 1. A person skilled in the art furthermore identifies the design in which the center of the relevant lining shoe radius is offset from its starting point by only the distance Y1c/Y1d.

Figure 3:
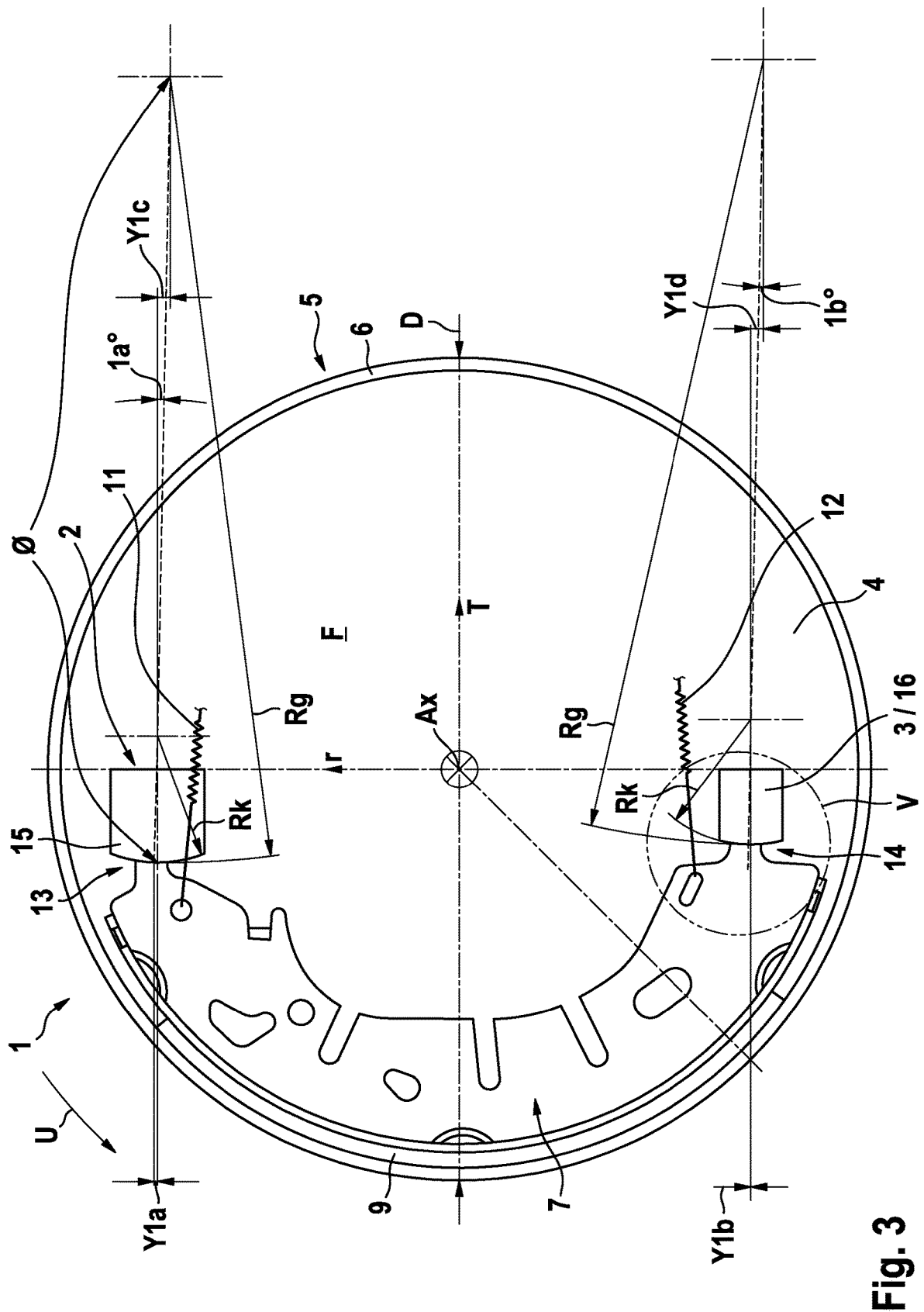
FIGS. 3 and 4 show another further development as an exemplary embodiment with an offset with respect to the axis illustrated in FIG. 3 in the non-worn, new state and with the maximum degree of wear in FIG. 4.
Figure 4:
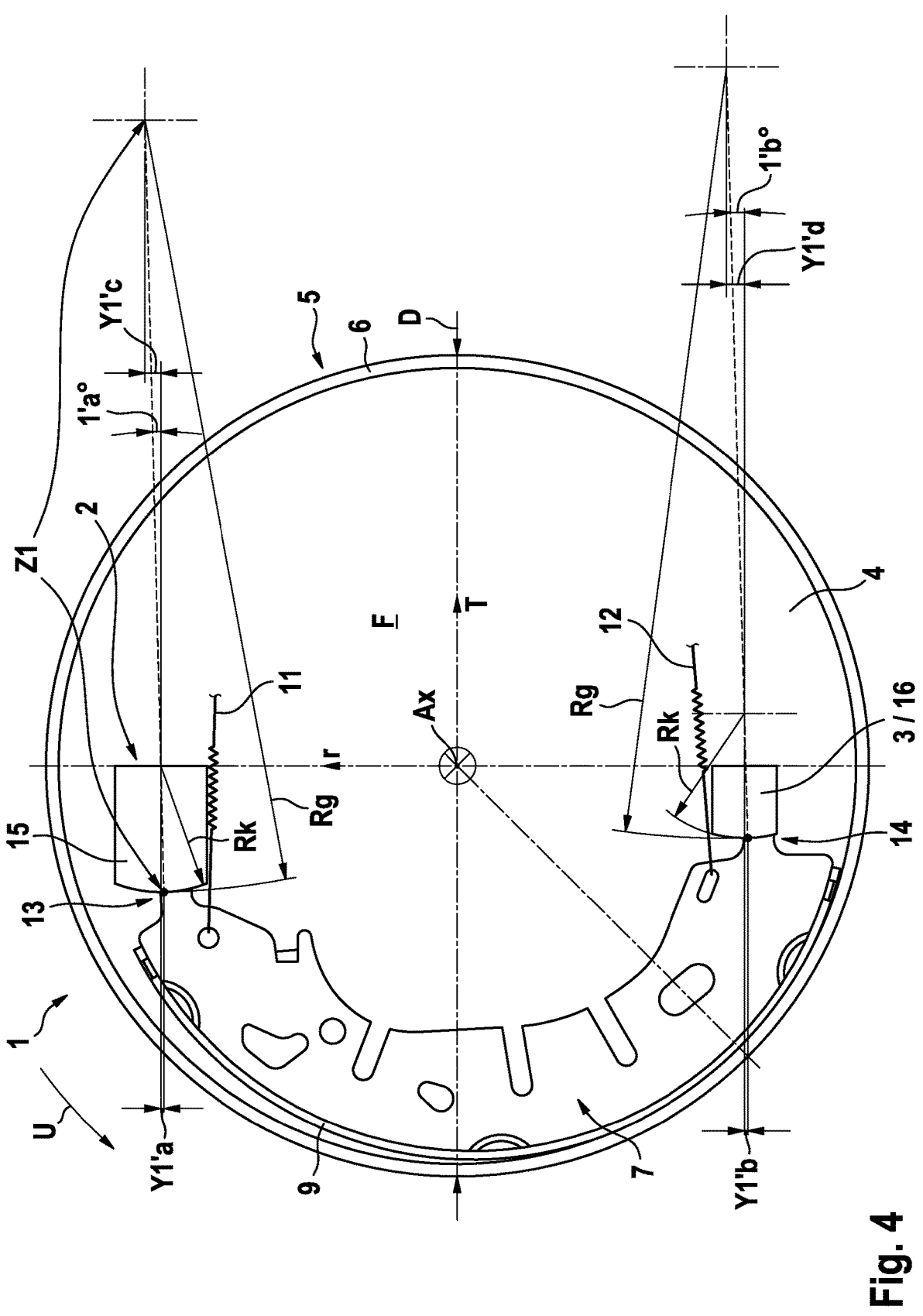

FIGS. 3 and 4 show another further development as an exemplary embodiment. This includes the variant with an offset of Y1c/Y1d with respect to the axis Rk (illustrated in FIG. 3 in the non-worn, new state). Owing to this offset, the contact point lies above said axis "Rk" by Y1a/Y1 b. With increasing lining wear, the contact point shifts, over the axis center of Rk, as far as Y1'a/Y1'b, with the maximum degree of wear (cf. FIG. 4). Owing to the offset, the maximum spacing (Y1a/Y1b/Y1'a and Y1'b) about the axis of Rk is smaller by approximately ½ than illustrated in FIG. 2.

Figure 5:
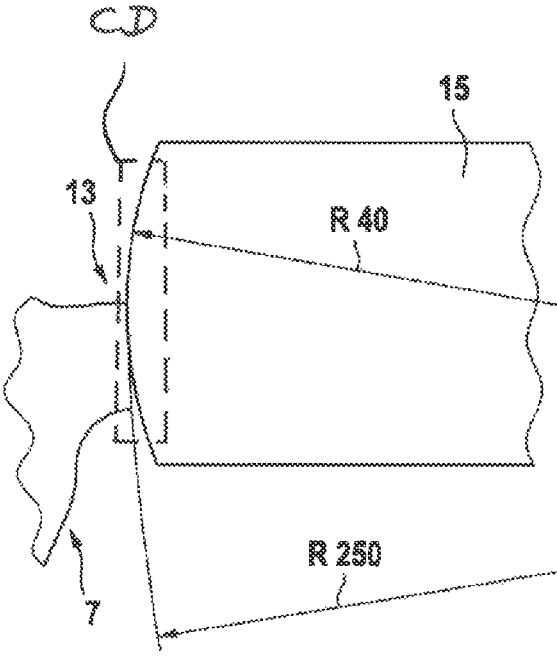
FIG. 5 shows the support bearing with geometrically implemented transverse offset compensation by way of example on the basis of the detail V in FIG. 2.

FIG. 5 shows the support bearing with geometrically implemented transverse offset compensation at position CD, on the basis of the detail V in FIG. 2, for example.

A drum brake 1, or an electronic brake system having one or more drum brake(s) 1 is designed for a motor vehicle. This may in principle be an electrical service brake apparatus that is designed to be open when electrically deenergized, or an electrical immobilizing brake apparatus that is designed to impart an immobilizing action when electrically deenergized, and a combination based on a combined immobilizing brake and service brake apparatus is likewise possible.

In this context, the schematic drawing illustrates, in principle, a drum brake 1 which, by way of example and for the purposes of simplification, is of special simplex type, and is thus illustrated as a simple service brake, wherein, for simplicity, the illustration does not show the immobilizing brake device, which is additionally possible in principle and which is to be provided so as to impart an immobilizing action when electrically deenergized. Yet further types of brakes (for example dual servo, duplex, dual duplex) are ultimately also possible in principle from a design aspect.

For the purposes of actuation, the drum brake 1 may have, on a front side, a spreading device 2 which is hydraulically and/or electromechanically actuatable and which has at least one or as illustrated two actuating elements 15, 16, which are displaceable in translational fashion in relation to the anchor plate 4, and an abutment 3, which actuating elements and abutment are each fixed to a front side F of the anchor plate 4, wherein the anchor plate 4 with its components and attachment parts fixed to the anchor plate, which may include an electromechanical wheel brake actuator on the anchor plate rear side, which electromechanical wheel brake actuator is actuatable on a wheel-specific basis and can be fixed as a wheel brake actuating device to the anchor plate 4 so as to be fixed with respect to the vehicle and non-rotatable. The brake shoes 7, 8 are also mounted movably on the anchor plate 4, which brake shoes cooperate with a brake drum pot 6 of a brake drum 5 that is arranged fixedly with respect to the wheel, that is to say so as to be rotatable, relative to the anchor plate 4. Each brake shoe 7, 8 has a substantially rigid carrier for friction linings 9, 10, which are illustrated as having become gradually worn, and restoring springs 11, 12 may also be braced in elastically preloaded fashion between the brake shoes 7, 8 in order to, in principle, impart a restoring force to the brake shoes 7, 8, or retain the brake shoes 7, 8—proceeding from an unworn and non-actuated starting point "0"—in a non-actuated end position.

The arrangement is based on the realization that the friction lining wear, which is non-uniform for technical reasons, in cooperation with the brake drum leads, in the case of conventional drum brakes, to a geometrical transverse offset in the region of support bearing contacts 13, 13', 14, 14', with the consequence that a support bearing contact point is displaced, so to speak, orthogonally, transversely with respect to the spreading axis S of the actuating elements 15, 16 of the spreading device 2. Accordingly, in the region of spreading device 2 and abutment 3, the increasingly mutually transversely offset support/contact of the brake shoes 7, 8 can give rise to force couples, with the consequence that the spreading device 2 is not free from transverse forces, that is to say torque is introduced, as a result of which a gradually increasing transverse force load acts in the force flow of the spreading device 2. The arrangement and allows transverse force compensation or a reduction of the detrimental effects thereof.

In the case of an electric drum brake, the electromechanical geared motor drive is designed such that each drum brake may in principle be equipped with an individually associated electromechanical wheel brake actuator means for the purposes of wheel-specific closed-loop control, and it is likewise possible for multiple drum brakes to be equipped, via Bowden cable, with a common electromechanical actuator. A central electronic control unit may be provided for the electrical supply/actuation/closed-loop control of the actuator means, and it is likewise possible for each wheel brake module to have a local electronic control unit, which may be interlinked with further electronic control units. The drum brake 1 may have a force sensor means.

In the case of the drum brakes according to the known prior art, in the event of wear (from new to fully worn linings), the contact point that the brake shoes form with the spreading unit shifts significantly along the contact line, which leads to a large lever arm about the axis center of the spreading unit (see also FIG. 1). Furthermore, for example for electromechanically actuated drum brakes, no optimized design with regard to a central introduction of force from the brake shoes into the spreading unit has been realized.

The introduction of force by the lining may be as central as possible. Owing to the fact that force is conducted more centrally, piston jamming events which are possible in the case of existing hydraulic brake drum cylinders (and which lead to increased residual torques), and increased friction, are prevented or reduced. This leads to higher efficiency of the spreading unit. This introduction of force from the linings into the spreading unit is helpful for example in the case of electromechanical spreading units (for example ball screw or ball ramp systems). Aside from the higher efficiency, the transverse forces can be absorbed owing to shorter guide lengths. This consequently leads to smaller dimensioning of the electromechanical spreading units. Further, improved detection of values by correspondingly designed displacement/force measuring units at force transfer points, such as used in "dry" brake systems for brake torque monitoring. Here, transverse forces lead, for example, to transverse deflections that falsify the measured value.

In the case of the "contact design" pursued here with regard to the force contact point from drum brake lining to spreading unit, the lining displacement is greatly reduced by way of a "shell-disk design" (see also FIG. 3). This form must be selected such that the unavoidable transverse forces are kept as low as possible and are supported in a favorable manner. In the case of an embodiment with an additional "offset", the shift of the lining out of the axis center can be reduced yet further by virtue of the "start point" of the contact surface being displaced over the axis center. Thus, in the event of wear, the force contact point shifts over the axis center to the end point (fully worn linings).

The design may also be implemented in each case mirror-symmetrically at the contact surfaces.

The arrangement allows a reduction of the transverse forces and the shift of the force contact point on drum brake linings. As a result of this reduction, in the components involved, the transverse forces are reduced, whereby said components no longer need to be designed to be as robust with regard to said forces.

In particular, for new dry brake systems, which use for example spindle or ball/ramp systems to apply the spreading force, the spindles are subjected to lower transverse forces, and in the case of ball/ramp systems, the individual balls are more uniformly loaded. The guide systems of said spreading units can be shortened. This can be used to design smaller components and thus smaller spreading units. In the case of dry systems, the lining support is indeed also used for force/torque determination. Here, too, a central introduction of force provides for the accuracy of the force/torque determination, as already described. This furthermore also benefits existing hydraulic systems with guided pistons. In these, the transverse forces are reduced, and possible piston jamming events are thus prevented.

The embodiments can in principle improve applications for all drum brake systems in which drum brakes are present (simplex, duplex, dual duplex, . . . ).

As an embodiment, as small a radius as possible may be selected for Rk, and as large a radius as possible (even a straight line) should be selected for Rg. Owing to the fact that Rg shifts, it must be ensured in the case of Rg that, in the main range of use, as small an angle 1a°/1b°/1'a° and 1'b° as possible arises (see FIGS. 3a/b) if it is sought to reduce the transverse force as far as possible. This is for example possible with an offset as shown. In the case of Rk, the smallest radius is limited by the material properties.

It is possible in principle for the support bearings (contact points) to be provided universally at different components that are to be paired with one another, that is to say at drum brakes/drum brake shoes. It is likewise possible for the refinement to be provided only at very particular drum brake linings, such that, for example, only a preferential direction of rotation, whereas other contact points, which may be subject to a different loading profile, may be configured differently. The contact points may be configured mirror-symmetrically with respect to one another to a certain degree. Furthermore, the "shell-disk design" may also, instead of circular shapes, be replaced with different curvatures or approximated geometries. Furthermore, the above-mentioned principle may also be implemented in a differential design in which the lining carrier and the abutment are configured as multiple parts.

The invention claimed is:

1. A drum brake for a motor vehicle brake system comprising:

at least one of an actuator, a transmission device, an abutment, and a spreading device including an actuating element at least one of which are in a force flow, via support bearings, with movably mounted brake shoes cooperate with a brake drum;

a compensation device for brake shoe transverse offset is provided adjacent to one of the spreading device and the abutment, the transverse offset being an offset in a direction orthogonal to a spreading axis of the spreading device, wherein the compensation device is incorporated laterally adjacent to at least one of the spreading device and the abutment into the force flow of the brake shoe of the drum brake.

2. The drum brake for a motor vehicle brake system as claimed in claim 1, wherein the compensation device is positioned in a brake drum interior space.

3. The drum brake for a motor vehicle brake system as claimed in claim 1, wherein the compensation device is incorporated in form-fitting fashion directly into an interface between one of the abutment and the brake shoe and the actuating element and the brake shoe.

4. The drum brake for a motor vehicle brake system as claimed in claim 1, wherein the compensation device is incorporated in form-fitting fashion indirectly with the aid of at least one adapter component into an interface between one of the spreading device and the brake shoe and the abutment.

5. The drum brake for a motor vehicle brake system as claimed in claim 1, wherein the compensation device has a movable bearing arrangement.

6. The drum brake for a motor vehicle brake system as claimed in claim 1, wherein a master radius positioned on an actuating element is dimensioned to be gradually smaller than a slave radius positioned on a brake shoe.

7. The drum brake for a motor vehicle brake system as claimed in claim 6, wherein the master radius is at least 0.6-1.5 times the brake drum diameter, and wherein the paired counterpart of the slave radius on a brake shoe is $\frac{1}{4}$-$\frac{1}{20}$ times the brake drum diameter.

8. The drum brake for a motor vehicle brake system as claimed in claim 1, wherein at least one center of radius is offset in the transverse direction toward a wheel axis of rotation by a predefined offset.

9. The drum brake for a motor vehicle brake system as claimed in claim 1, wherein the brake shoes are assigned at least one compensation device for brake shoe transverse offset for all brake drum directions of rotation.

10. The drum brake for a motor vehicle brake system as claimed in claim 1, wherein each brake shoe is assigned a compensation device for brake shoe transverse offset for one brake drum direction of rotation.

11. The drum brake for a motor vehicle brake system as claimed in claim 1, wherein the compensation device for brake shoe transverse offset is assigned exclusively to one brake drum direction of rotation and exclusively to the at least one trailing drum brake shoe.

12. The drum brake for a motor vehicle brake system as claimed in claim 1, wherein an electrical motor vehicle brake system has a control unit for one of open-loop and closed-loop control of the drum brake.

13. The drum brake for a motor vehicle brake system as claimed in claim 1, wherein the electrical motor vehicle brake system has at least one of an electromechanically or electrohydraulically actuatable wheel brake.

* * * * *